United States Patent [19]
Nojiri et al.

[11] Patent Number: 5,268,057
[45] Date of Patent: Dec. 7, 1993

[54] TIRE BUILDING APPARATUS

[75] Inventors: Yasushi Nojiri; Sadaaki Naito, both of Kobe, Japan

[73] Assignee: Sumitomo Rubber Industries Ltd., Hyogo, Japan

[21] Appl. No.: 925,413

[22] Filed: Aug. 10, 1992

Related U.S. Application Data

[63] Continuation of Ser. No. 625,012, Dec. 10, 1990, abandoned.

[30] Foreign Application Priority Data

Dec. 14, 1989 [JP] Japan .................. 1-325170
Dec. 18, 1989 [JP] Japan .................. 1-327957

[51] Int. Cl.⁵ .................................. B29D 30/24
[52] U.S. Cl. .................................. 156/415; 156/420
[58] Field of Search ............ 156/414, 415, 416, 417, 156/420

[56] References Cited

U.S. PATENT DOCUMENTS

| | | | |
|---|---|---|---|
| 3,188,260 | 6/1965 | Nebout | 156/401 |
| 3,237,199 | 2/1966 | Brey | 156/132 |
| 3,547,733 | 12/1970 | Leblond | 156/415 |
| 3,833,324 | 9/1974 | Klopper | 156/416 |
| 3,948,717 | 4/1976 | Suzuki et al. | 156/417 X |
| 4,010,058 | 3/1977 | Kubinski et al. | 156/415 |
| 4,402,783 | 9/1983 | Enders | 156/415 |

FOREIGN PATENT DOCUMENTS 0238788 9/1987 European Pat. Off. .
1729780 2/1972 Fed. Rep. of Germany .
2352661 12/1977 France .

Primary Examiner—Michael W. Ball
Assistant Examiner—Francis J. Lorin
Attorney, Agent, or Firm—Birch, Stewart, Kolasch & Birch

[57] ABSTRACT

A tire building apparatus includes a former made of a plurality of segment units arranged in a circumference, an inner shaft extending through the former, an outer shaft and a sleeve mounted on the inner shaft, the outer shaft and the sleeve carrying a right guide mechanism, a left guide mechanism, a right slider, and a left slider respectively, a right link mechanism, and left link mechanism provided between the right slider and the right guide mechanism, a left link mechanism provided between the left slider and the left guide mechanism. Another tire building apparatus includes a former made of a plurality of segment units arranged having a center segment, a right side segment, and a left side segment, and a right moving device for moving the right side segment in axial and radial directions, a left moving device for moving the left side segment in axial and radial directions, and a center segment support device for supporting the center segment with radially inward biasing. The former can be set into an axially expanded state, an axially contracted state, a radially expanded state, and a radially contracted state.

6 Claims, 9 Drawing Sheets

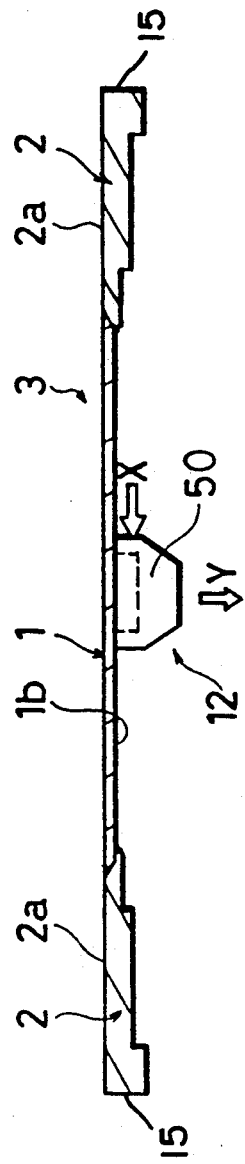
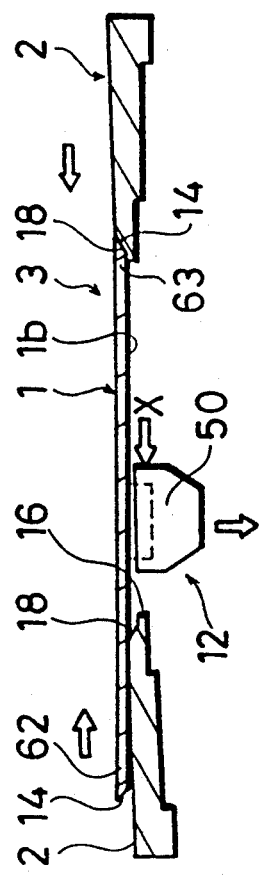
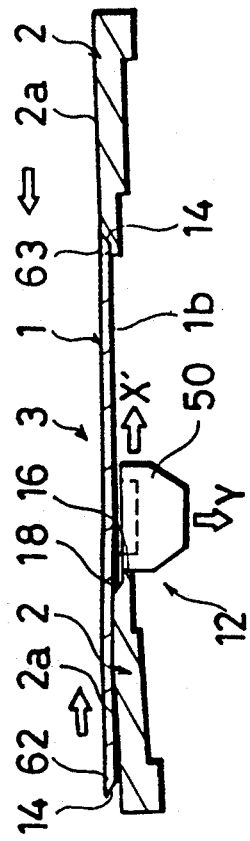

TIRE BUILDING APPARATUS

This application is a continuation of U.S. patent application Ser. No. 07/625,012, filed on Dec. 10, 1990, now abandoned.

BACKGROUND OF THE INVENTION

This invention relates to a tire building apparatus, particularly to a single-stage tire building apparatus.

Conventionally, there have been two ways to build raw tires, particularly radial tires. One is a single-stage way. The other is a two-stage way.

In the two-stage way, a cylindrical carcass is first built by a carcass former. Thereafter, the built cylindrical carcass is dismounted from the carcass former, and transferred and mounted on a shaping drum. Accordingly, the two-stage way necessitates a transfer device, which results in a large scale construction and inefficient operation. In addition, the tire components of the carcass are liable to deform during storage. Also, there is a likelihood that the carcass will deform when transferring to the shaping drum. Consequently, the raw tire turns out to be inferior in uniformity.

The conventional single-stage way avoids the above-mentioned drawbacks of the two-stage way. However, in the conventional single-stage way in which the carcass building and the toroidal shaping are carried out on the same drum, it is very difficult to make it possible to expand and contract the diameter of the former in terms of space. For this reason, the diameter of the conventional former must be smaller than the bead diameter of a built raw tire so as to enable the shaped raw tire to be dismounted from the former, while in the two-stage way, a carcass former having a diameter greater than the bead diameter of a raw tire is usable. Accordingly, the circumferential carcass ply application length is smaller in the single-stage way than in the two-stage way, so that the total volume of carcass plies used in the single-stage way turns out to be less than in the two-stage way. Consequently, in the conventional single-stage way, it has been necessary to use carcass plies having an increased cord density.

Furthermore, the conventional single-stage way uses a rubber former and a bladderless former. The rubber former is flexible in the central area of the former. The bladderless former has a space in the central area. Accordingly, in these formers, it is difficult to apply a pressing roller successfully over the tire carcass built on the former with a view to giving a good adhesion between the tire components, such as insulation rubber, carcass plies, beads, apexes, side wall rubber and others.

In the conventional single-stage way, also, there has been a comb-tooth type metal former. In this type, a rubber covering is necessary to fill up gaps between comb-tooth segments in an expanded state thereof.

Also, the conventional metal former includes a number of segment units each having a center segment and opposite side segments. There have been the following problems. When the side segments are moved nearer to each other, the center segment is liable to move away from the side segments. Consequently, the center segment is not stationary in the center position of the former when the former is in both the axially expanded state and the axially contracted state. Also, due to the fact that the center segment is not positioned in the center of the former when the tire components are applied on the axially expanded former, the toroidal shape of the carcass ends up being deformed in the shaping step.

In the conventional single-stage way, furthermore, side wall rubbers are turned up around the bead rings together with the overhang portions of the carcass on the drum. Accordingly, the side wall rubbers are liable to slide out of the position, which consequently impairs uniformity of the tire.

It is an object of the present invention to provide a single-stage tire building apparatus which is free from the above-mentioned drawbacks of both the single-stage way and the two-stage way but has the advantages of both.

SUMMARY OF THE INVENTION

Accordingly, a tire building apparatus of the present invention comprises former means including a plurality of segment units arranged in a circumference, the segment unit having at least a right side segment and a left side segment, an inner shaft extending through the former means, an outer hollow shaft axially slidably mounted on the inner shaft, a sleeve axially slidably mounted on the inner shaft, right guide means provided between the right side segment and the outer hollow shaft for guiding the movement of the right side segment in the radial direction and in the axial direction, left guide means provided between the left side segment and the sleeve for guiding the movement of the left side segment in the radial direction and in the axial direction, right slider means axially slidably mounted on the outer shaft, left slider means axially slidably mounted on the sleeve, a right link mechanism provided between the right guide mean and the right slider means for moving the right side segment in a radial direction in accordance with an axial movement of the right slider means, and a left link mechanism provided between the left guide means and the left slider means for moving the left side segment in a radial direction in accordance with an axial movement of the left slider means, whereby the outer shaft and the sleeve, the right slider means and the left slider means are respectively moved closer to and away from each other so as to set the former means into an axially expanded state, a radially expanded state, an axially contracted state, and a radially contracted state.

With the above-mentioned construction, when the right slider means and the left slider means are moved closer to and away from each other together with the outer shaft and the sleeve, the right and left side segments are moved in the axial direction following the axial movements of both sliders so that the former means is set into the axially expanded state and the axially contracted state. Further, when the right and left slider means are moved in the axial direction, the right and left side segments are moved in the radial direction, so that the former means is set into the radially expanded state and the radially contracted state, specifically, the former means is set into the radially expanded state of making the diameter of the former means greater than the bead diameter of a tire so as to provide a carcass ply application periphery, and the radially contracted state of making the diameter of the former means smaller so as to enable the built raw tire to dismount.

Also, a tire building apparatus of the present invention comprises former means including a plurality of segment units arranged in a circumference, the segment unit having a center segment, a right side segment, and a left side segment, right moving means for moving the right side segment in at least the axial direction, left moving means for moving the left side segment in at least the axial direction, and center segment support means for supporting the center segment in a central position of the former means, the center segment support means including an axially extended rod attached to on of the side segment moving means, a block radially movably attached to the center segment and slidably supported by the axially extended rod, a first biasing member provided on the block for biasing the center segment in a inner radial direction so as to bring the center segment into contact with the right side segment and the left side segment, and a second biasing member provided between one of the side segment moving means and the block for biasing the block toward the other side segment when both side segments are moved closer to each other.

With the above-mentioned construction, when both side segments are synchronously moved closer to each other, the center segment and one side segment are together pushed to the other side segment owing to the fact that the block is biased toward the other side segment by the second biasing member, and the center segment is biased in the inner radial direction by the first biasing member. When both side segments are moved further closer to each other, an inner side of the other side segment comes into contact with the block. When both side segments are moved closer to each other, one side segment is moved to the other side segment against the second biasing member until an inner side of the one side segment comes into contact with the block. Accordingly, the center segment can remain stationary in the center position of the former without moving away from both side segments when both side segments are in the closest positions.

This and other objects, features and advantages of the present invention will become more apparent upon a reading of the following detailed description and drawings.

BRIEF DESCRIPTION OF THE DRAWINGS

FIGS. 4A, 4B, and 4C are diagrams showing stages in which the segment unit of the former is axially contracted;

DETAILED DESCRIPTION OF THE PREFERRED EMBODIMENTS

A preferred embodiment of the present invention will be described with reference to the drawings.

Figure 1:
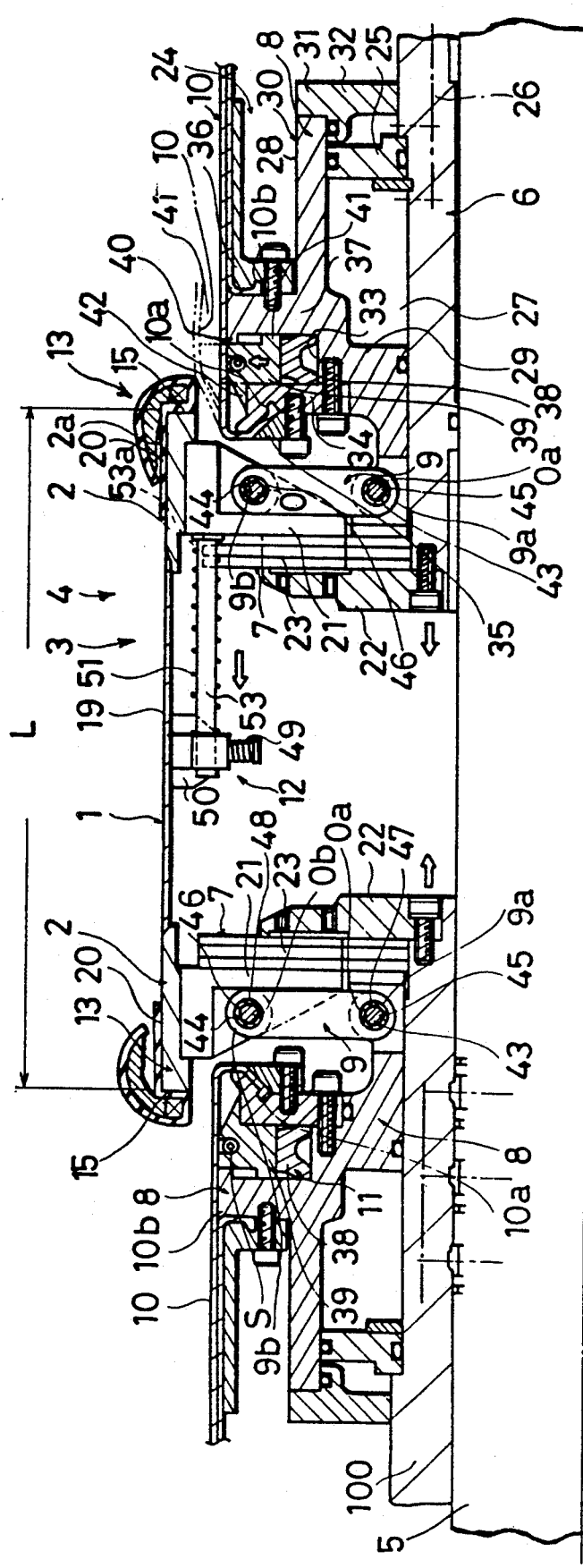
FIG. 1 is an enlarged sectional view showing a main portion of a tire building apparatus embodying the present invention, a former of the tire building apparatus being in an axially expanded state and a radially expanded state.

Referring to FIG. 1 showing a main portion of a tire building apparatus of the present invention, the tire building apparatus includes a cylindrical former 4, an inner shaft 5, an outer shaft 6, a cylindrical sleeve 100, and sliders 8, 8.

The former 4 includes a plurality of segment units 3 which are arranged in a circumferential direction so as to form a hollow cylinder. Each segment unit 3 comprises a rigid center segment 1 made of metal, plastics, or the like, and a pair of rigid side segments 2 made of metal, plastics or the like. The inner shaft 5 is placed in the former 4. The outer shaft 6 is in the form of a hollow cylinder and axially movably mounted on the inner shaft 5. Also, the sleeve 100 is mounted on the inner shaft 5 so that the outer shaft 6 and the sleeve 100 can be moved closer to and away from each other in the axial direction.

Also, the slider 8 carries a turn-up bladder 10, a pressing device 11 for pressing radially outwardly the turn-up bladder 10 against the bead ring around which side end portions of the carcass have been turn up. The outer shaft 6 or the sleeve 100 carries a guide mechanism 7, and a center segment support mechanism 12 for moving the center segment 1 in the radial direction following radial movements of the side segments 2. The guide mechanisms 7 are provided between one side portion of the former 4 and the sleeve 100, and between the other side portion of the former 4 and the outer shaft 6. Further, a link mechanism 9 is provided between the guide mechanism 7 and the slider 8 for moving the side segment 2 in the radial direction. The link mechanism 9 is actuated by axial movement of the slider 8.

Accordingly, the former 4 can be expanded and contracted in the axial direction as well as in the radial direction. In other words, the shoulder portions 13 of the former 4 can be moved closer to and away from each other in the axial direction. Also, the diameter of the former 4 can be changed.

Figure 8:
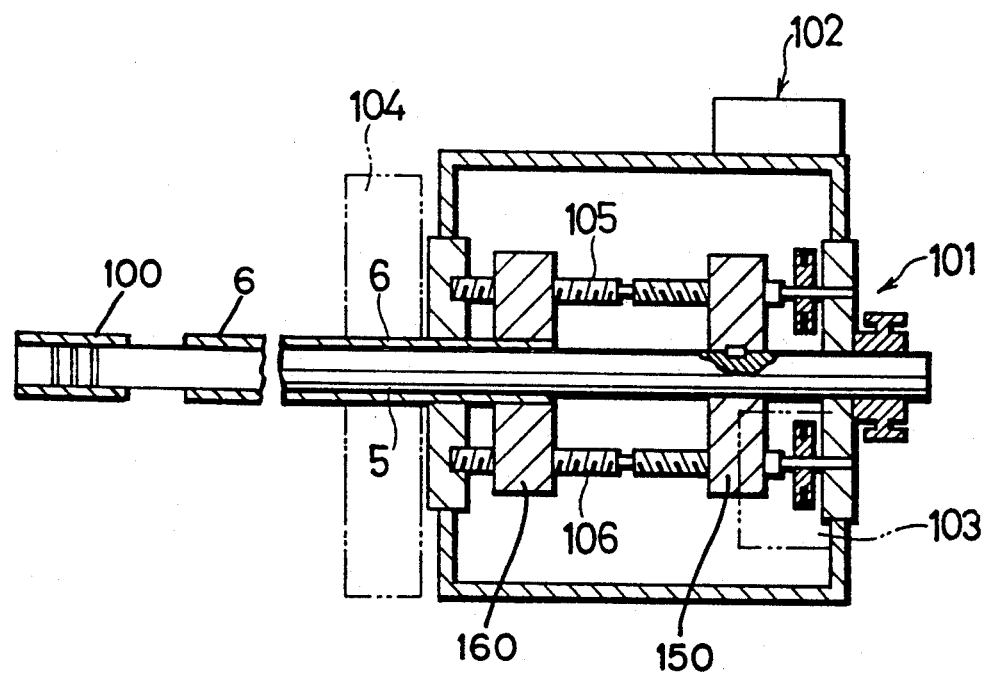
FIG. 8 is a sectional view showing a driving mechanism of the tire building apparatus.

As shown in FIG. 8, the inner shaft 5 is rotatably supported in a support frame 101. The sleeve 100 is fixedly mounted on the inner shaft 5. The outer shaft 6 is axially slidably mounted on the inner shaft 5. Indicated at 105, 106 are screw shafts for driving the sleeve 100 and the outer shaft 6. The screw shafts 105, 106 each have two screw sections which have the opposite thread directions to each other. A flange member 150 is connected to the inner shaft 5 by a way of a bearing. A flange member 160 is connected to the outer shaft 6 by a way of a bearing. The screw shafts 105 and 106 extend through the flange members 150 and 160, whereby the rotation of the screw shafts 105 and 106 cause the flange members 150 and 160 to move in opposite directions, and also cause the outer shaft 6 and the sleeve 100 to move in opposite directions. The screw shafts 105, 106 are driven by a motor unit 103. Indicated at 102 is a driving motor for turning the outer shaft 6 and the inner shaft 5 fixed with the sleeve 100 to revolve the former 4 about the inner shaft. Indicated at 104 is a bead setting device for setting a bead ring to a side end portion of the former.

Figure 6:
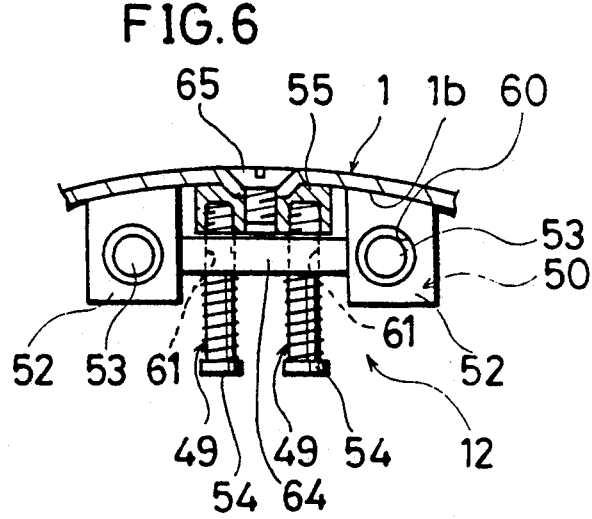
FIG. 6 is a side view of the center segment support mechanism.

As shown in FIG. 6, the center segment 1 of the segment unit 3 is in the form of an arc when viewed in the circumferential direction. Also, as shown in FIG.

4A and 4B the center segment 1 is formed with tapered faces 14, 14 in the opposite end portions. The side segment 2 is in the form of the same arc as the center segment 1. Accordingly, the circumferential length of a cylinder made of the side segments is the same as that of a cylinder made of the center segments. Also, the side segment 2 is formed with a vertical face 15 in the outside end portion, and a horizontal face 2a and a tapered face 18 in the inside end portion 16. The side segments and the center segment have such axial lengths that the center segment will not move away from the side segments, thereby preventing damage to the carcass when the side segments move toward and away from each other.

As shown in FIGS. 1, 4A and 4B, when the former 4 is expanded in the axial direction to be set in an axially expanded state, the tapered faces 14 of the center segment 1 come into contact with the tapered faces 18 of the side segments 2, and the outer surface 19 of the center segment 1 and the outer surfaces 20 of the side segments 2 form a continuous surface without any steps.

Figure 2:
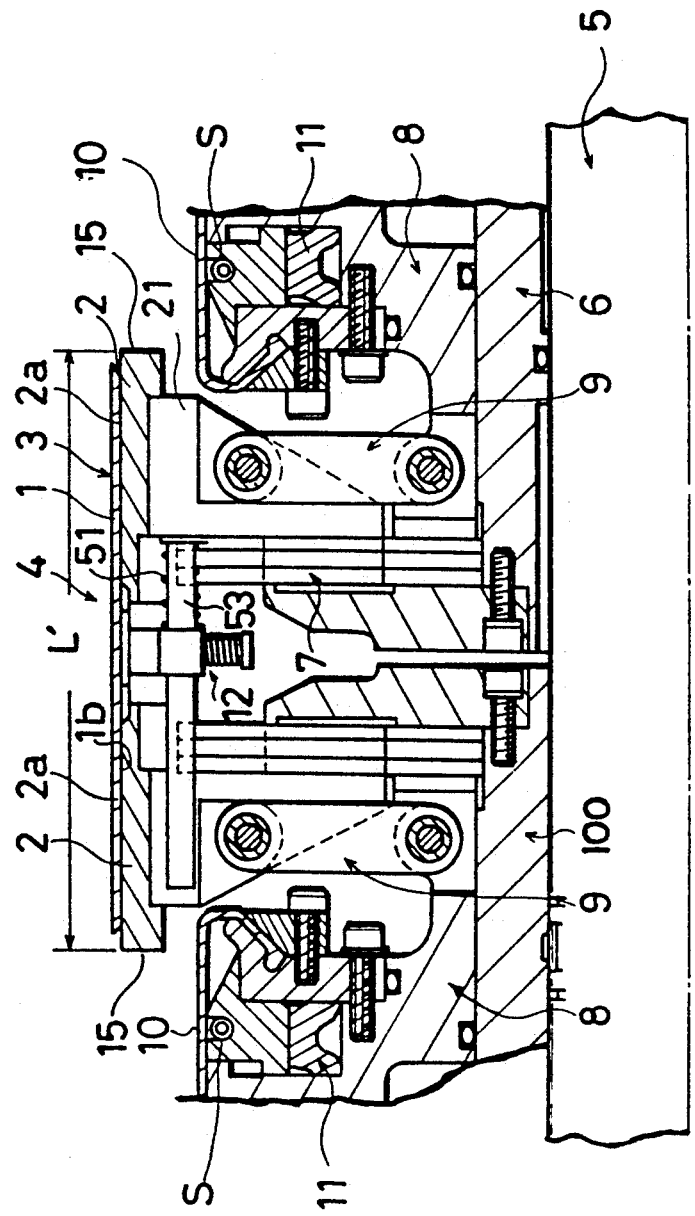
FIG. 2 is an enlarged sectional view showing the main portion, the former being in an axially contracted state and the radially expanded state.

When the side segments 2 are moved closer to each other in the direction of an arrow shown in FIG. 1, i.e., in the axial direction to be set in an axially contracted state, the center segment 1 comes over and overlaps with the side segments 2 as shown in FIG. 2. The sleeve 100 is fixedly attached to the inner shaft 5. The outer shaft 6 is axially movably mounted on the inner shaft 5 which is supported at one end by the support frame 101. The sleeve 100 and the outer shaft 6 are moved closer to and away from each other by driving the screw shafts 105 and 106 in a predetermined direction with the motor unit 103.

The guide mechanism 7 guides the movement of the side segment 2 in a radial direction and allows the side segment 2 to move in the axial direction in accordance with axial movements of the outer shaft 6. The guide mechanism 7 includes a block 21 fixedly attached to the underside of the side segment 2, a block 22 fixedly attached to the outer shaft 6, and a linear guide member 23 provided between the block 21 and the block 22.

A cylindrical mechanism 24 has a ring piston 25 fixedly attached to the outer shaft 6 (or the sleeve 100), and a cylinder tube mounted on an outer surface of the outer shaft 6 (or the sleeve 100). The cylinder 24 has an hydraulic passage 26. The slider 8 is moved in the axial direction by feeding and discharging hydraulic pressure to and from a chamber 27 defined by the cylinder tube, the fixed ring piston 25, and the outer shaft 6 (or the sleeve 100).

Further, the slider 8 includes a body 30 having a periphery wall 28 and an inner wall 29, and an outer wall 31 defined by a cover plate 32, and forms the cylindrical tube of the cylinder mechanism 24. The slider 8 has an annular recess 33 defined by a flange 37 formed on the periphery wall 28, and a block 34. The pressing device 11 is provided in the annular recess 33. The turn-up bladder 10 is attached to the slider with its inside end portion 10a held between the blocks 34, 35, and its outside end portion 10b held between the flange 37 and a block 36.

The pressing device 11 includes a resilient ring 38 and a plurality of pressing members 39 placed on the resilient ring 38. The resilient ring 38 is radially expanded so as to allow the pressing member 39 to press the bladder 10 in the direction of an arrow shown in FIG. 1. In FIG. 1, the bladder 10 pressed by the pressing device 11 is illustrated by phantom lines. The pressing member 39 is kept from moving radially outward by a projection 40 formed on an outer portion of the flange 37, and a projection 41 formed on the pressing member 39. Also, the pressing member 39 is formed with a projection 42 made in contact with the block 34. Indicated at S is a spring for urging the pressing member 39 in an inner radial direction.

The link mechanism 9 connects the slider 8 with the guide mechanism 7. One end 9a of the link mechanism 9 is pivotably attached to slider 8. The other end 9b of the link mechanism 9 is pivotably attached to the block 21 of the guide mechanism 7. Specifically, both ends 9a and 9b of the link mechanism 9 are formed with holes 43 and 44. A pivot 45 provided on the slider 8 is inserted in the hole 43. A pivot 46 provided on the block 21 is inserted in the hole 44. Indicated at 47, 48 are bushes mounted on the pivots 45, 46 respectively.

Accordingly, when the slider 8 is axially moved, a pivot point 0a on the end 9a of the link mechanism 9 is moved in the axial direction, another pivot point 0b on the end 9b of the link mechanism 9 is moved in the radial direction. Consequently, the block 21 is moved in a radial direction so that the side segment 2 is moved in a radial direction.

Figure 7:
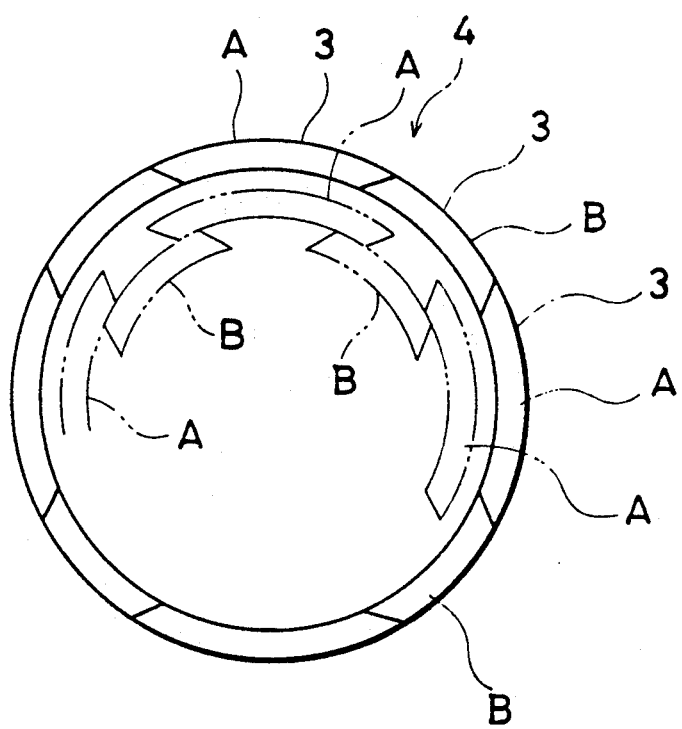
FIG. 7 is a diagrammatic side view showing the former set in a radially expanded state and a radially contracted state.

As shown in FIG. 7, further, the segment units 3 are grouped into two types A and B in respect of circumferential lengths, specifically, type A having a long circumferential length and type B having a short circumferential length. Type A segment units and type B segment units are alternately arranged in a circumferential direction. A link mechanism 9 for a type A segment unit has a longer link member than a link mechanism 9 for a type B segment unit so that when the former 4 is contracted in the radial direction, type A segment units end up in the more outward positions and type B segment units end up in the more inward positions.

Figure 5:
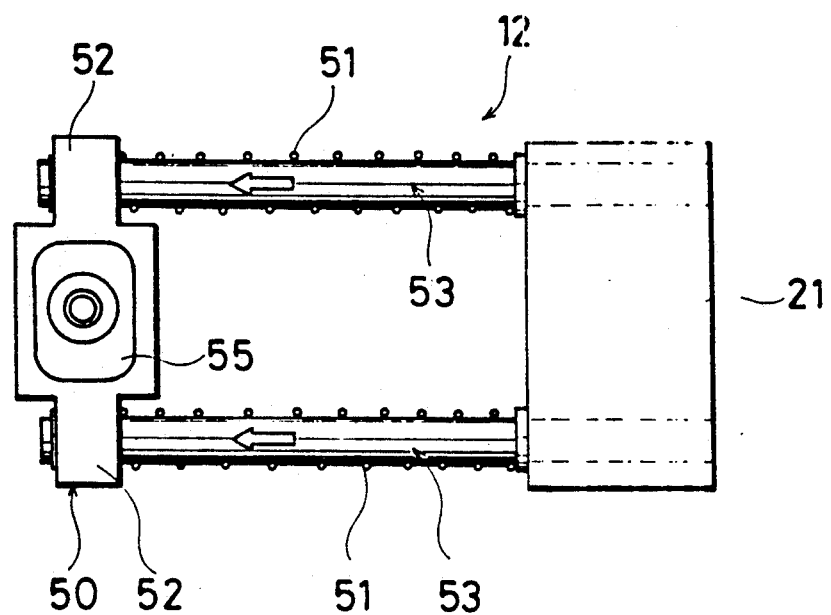
FIG. 5 is a plan view showing a center segment support mechanism of the tire building apparatus.

As shown in FIGS. 5 and 6, the center segment support mechanism 12 includes an element 50 attached to the underside of the center segment 1, a first biasing member mounted on the element 50 for urging the center segment 1 radially inward, and a second biasing member for urging the element 50 in the direction of an arrow. Specifically, the element 50 is formed with a pair of projections 52, 52. The projections 52 each have holes 60 through which two horizontal rods 53 are inserted respectively. One end 53a of the horizontal rod 53 is supported by the block 21. The projections 52 are axially slidable on the rods 53 respectively. The springs 51 are provided on the respective rods 53 between the block 21 and the projections 52.

The element 50 has a portion 55 which is attached to the center segment 1 with a screw 65. The element 50 has a body 64 formed with two holes 61. Two stems 54 are passed through the respective holes 61 and screwed into the portion 55. The springs 49 are mounted on the respective stems 54. Accordingly, the element 50 is allowed to move in the radial direction with respect to the center segment 1, but is not allowed to move in the axial direction. The center segment is pulled radially inward and comes into contact with the side segments from the outside.

Next, operation of the tire building apparatus will be described.

By moving the outer shaft 6 and the sleeve 100 closer to each other, the former 4 is changed from the axially expanded state shown in FIG. 1 where the respective outer surfaces 19, 20, 20 of the center segment 1 and the side segments 2 form the continuous surface, to the axially contracted state shown in FIG. 2. Consequently, the sliders 8 come closer to each other. In a first stage of this contracting course, the center segment 1 and side segments 2 of the segment unit 3 are in state shown in FIG. 4A. When the side segments come closer to each other, the element 50 of the center segment support mechanism 12 is pushed in the directions of arrows X and Y. Consequently, as shown in FIG. 4B, a left side segment 2 comes under one end 62 of the center segment 1, moving toward a right side segment 2 while sliding under the center segment 1. At the same time, the center segment 1 moves upward. However, the element 50 can follow the upward movement of the center segment 1 because the element 50 is movable in the radial direction.

After an inside end face 16 of the left side segment 2 comes into contact with the element 50 as shown in FIG. 4C, the left side segment 2 pushes the center segment 1 in the direction of an arrow X' against the pushing force of the springs 51, so that the other end portion 63 of the center segment 1 comes over the right side segment 2.

When both side segments 2 are further moved closer to each other, the center segment 1 is moved in the direction of the arrow X' together with the left side segment 2, while the right side segment 2 is moved toward the left side segment 2 while sliding under the center segment 1. Consequently, the axial length of the former 4 is changed from L shown in FIG. 1 to L' shown in FIG. 2. In both the axially contracted state and the axially expanded state (length L and L'), the center segment 1 remains approximately at the center of the former.

When the sliders 8 are moved away from each other, the side segments 2 of the segment units 3 are moved radially inward. Consequently, the former 4 comes into a radially contracted state shown in FIG. 3. In other words, the diameter of the former 4 is decreased.

Figure 9A:
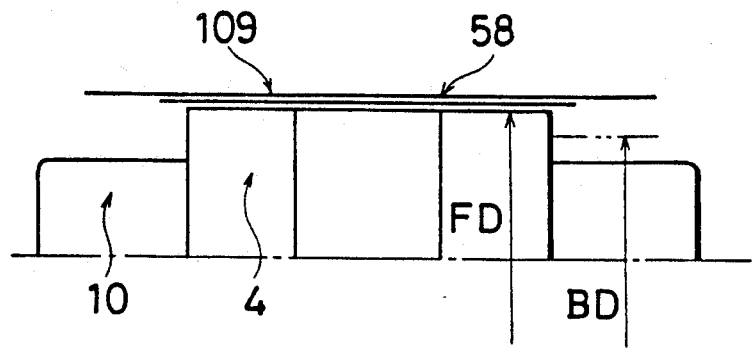
FIGS. 9A to 9G are schematic diagrams showing stages in which a raw tire is built by use of the tire building apparatus of the present invention.

With use of this tire building apparatus, a raw tire is built as follows. As FIG. 9A, first, the former 4 is set in the axially expanded state with an axially long length and the radially expanded state, that is, the state shown in FIG. 1. In this state, the diameter FD of the former 4 is greater than the bead diameter BD of the tire. On the former 4 are applied carcass plies 109 to form a cylindrical carcass 58.

Figure 9B:
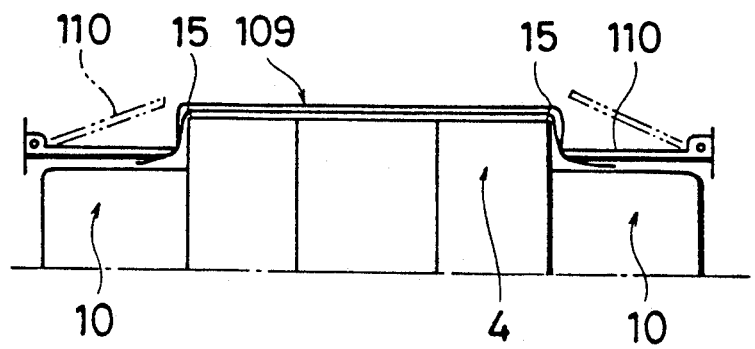
Figure 9C:
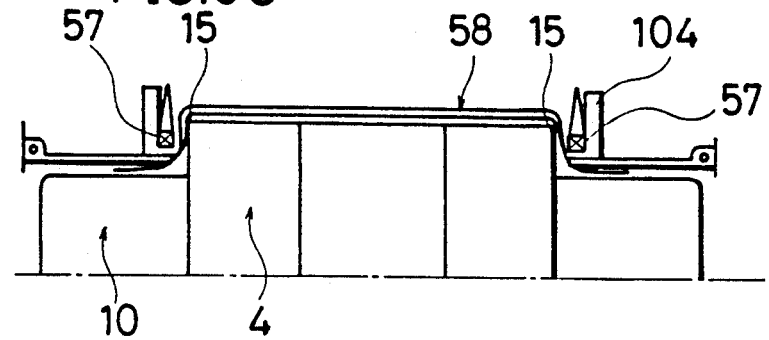
Figure 9D:
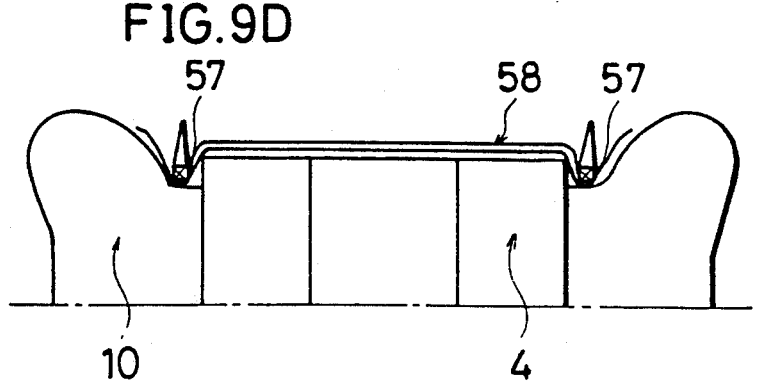

The opposite end portions of the carcass 58, in other words, portions overhung outward from the end faces 15 of the side segments 2, are turned down by a known turn down finger device 110 as shown in FIG. 9B. Subsequently, as shown in FIG. 9C, each of bead rings 57 having an apex is set on the end face 15 of the side segment 2 through the turn down carcass by the bead setting device 104. Thereafter, as shown in FIG. 9D the opposite end portions of the carcass 58 are turned up around the bead ring 57 by supplying air or other fluid into the turn-up bladders 10 to expand.

Figure 9E:
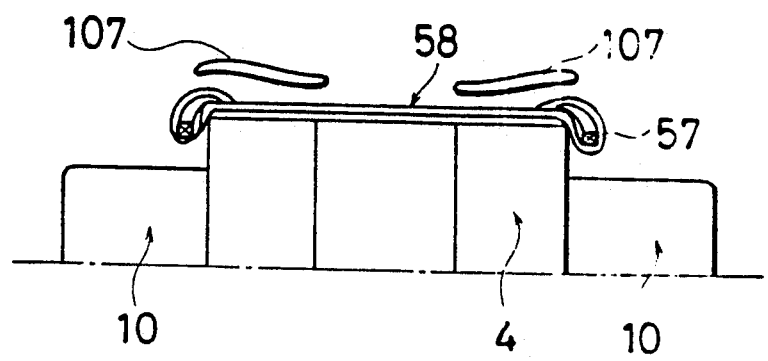
Figure 9F:
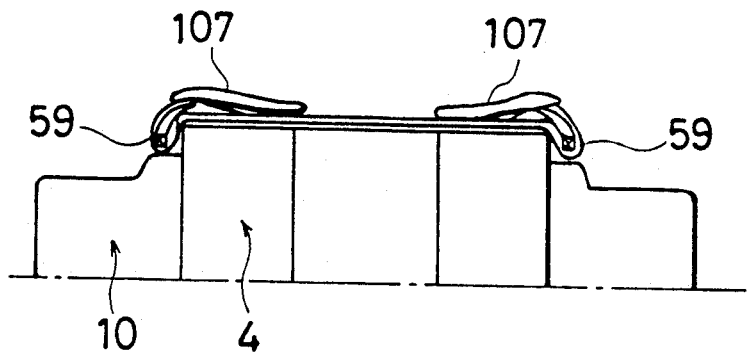

Thereafter, the fluid is drawn out from the bladders 10. A pair of side walls 107 are applied on the carcass 58 covering the turned-up portions as shown in FIG. 9E. Subsequently, the pressing members 39 of the pressing device 11 are radially expanded so as to look the bead portions as shown in FIG. 9F.

Figure 9G:
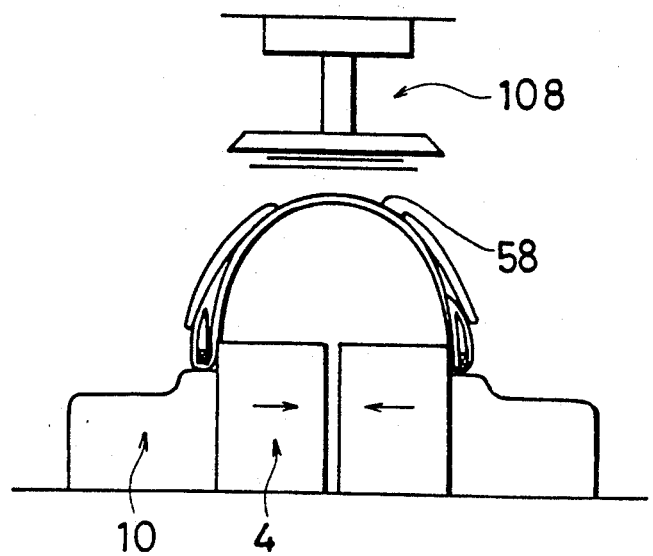

With the bead portions being locked, the sleeve 100 and the outer shaft 6 are moved closer to each other. At the same time, as shown in FIG. 9G, air or other fluid is supplied in the cylindrical carcass 58 so that the carcass 58 is expanded into a toroidal shape until an upper portion of the carcass 58 is united with a breaker tread assembly 108. The breaker tread assembly 108 is disposed in an axially intermediate position of the former 4 surrounding the carcass 58.

Figure 3:
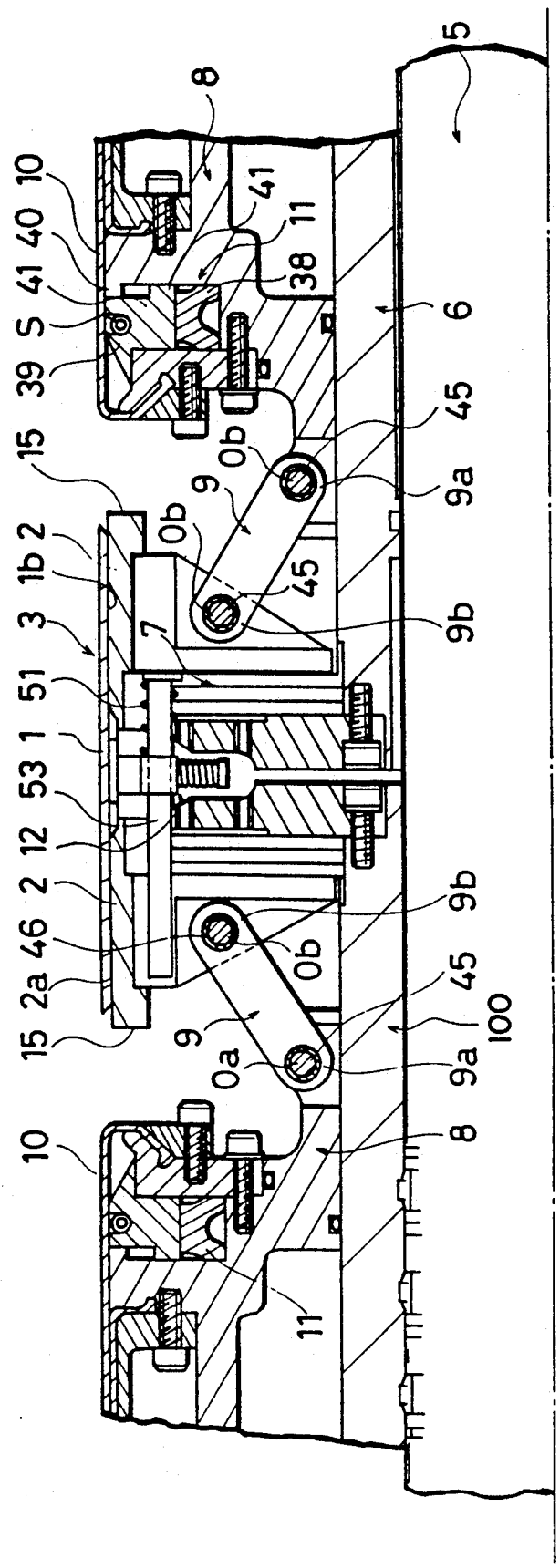
FIG. 3 is an enlarged sectional view showing the main portion, the former being in the axially contracted and radially contracted state.

Finally, as shown in FIG. 3, the sliders 8 are moved away from each other so as to decrease the diameter of the former 4. The toroidally shaped raw tire is dismounted from the former 4.

From the above description, it will be seen that the tire building apparatus has the following advantageous effects.

1. When tire components are applied on the former to form a cylindrical carcass, the former can be expanded in a radial direction as well as an axial direction, which makes it possible to render a greater diameter of the former than the bead diameter of a tire to be built. Accordingly, although the tire building apparatus employs a single-stage way, the tire building apparatus makes it possible to use carcass plies whose ply cord specification is normal such as are usually used in the two-stage tire building. Consequently, an increased productivity and an improved operability can be attained.

2. When a raw tire is built, the diameter of the former can be made smaller than the bead diameter of the built raw tire, so that the raw tire can be dismounted from the former with ease.

3. With the former diameter for application of tire components being greater than that of the conventional single-stage former, the expansion rate of carcass plies when toroidally shaped becomes smaller.

4. Without using such rubber cover rings and the like, the tire building apparatus can provide a rigid and flat application peripheral surface section to ensure a proper pressing operation. Accordingly, insulation rubber, carcass plies, bead rings, side wall rubbers and the like can be satisfactorily adhered to one another.

5. The tire building apparatus employs a single-stage way and therefore has the advantage of producing tires at a high uniformity.

6. The tire building apparatus needs less installation space and a smaller number of operators, which assures higher productivity.

7. The tire building apparatus is provided with the bead pressing device. Accordingly, the turn-up bladder can be assuredly pressed to the bead. Carcass expanding fluid can be kept from escaping from the carcass when shaping the carcass into the toroidal shape.

8. Bead rings can be set at the vertical end faces of the side segments of the former.

9. The center segment is not projected from the side segments when the side segments are moved closer to each other. The center segment remains approximately at the center position of the former in both the axially expanded state and the axially contracted state (the former lengths L and L'). When tire components are applied, the center segment remains in the center position. In other words, centering can be assuredly performed. Accordingly, no deformation of a toroidal shape of the carcass ply will occur in the shaping step. Also, applied tire components can be pressed to attain assured adhesion. Further, a tire component application periphery having no gap can be provided without using a rubber covering.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A tire building apparatus comprising:
former means including a plurality of segment units arranged in a circumference, each of said segment units having at least a right side segment, a left side segment, a center segment, and center segment support means for supporting said center segment in a central portion of said former means;
an inner shaft extending through said former means;
an outer hollow shaft mounted on said inner shaft;
a sleeve mounted on said inner shaft;
right guide means provided between said right side segment and said outer hollow shaft for guiding movement of said right side segment in a radial direction and an axial direction;
left guide means provided between said left side segment and said sleeve for guiding movement of said left side segment in a radial direction and in an axial direction;
right slider means axially slidably mounted on said outer hollow shaft;
left slider means axially slidably mounted on said sleeve;
a right link mechanism provided between said right guide means and said right slider means for moving said right side segment in a radial direction in accordance with an axial movement of said right slider means; and
a left link mechanism provided between said left guide means and said left slider means for moving said left side segment in a radial direction in accordance with an axial movement on said left slider means;
whereby said outer hollow shaft and said sleeve are moved farther away from each other so as to set said former means into an axially expanded state, said right slider means and said left slider means are moved closer to each other so as to set said former means into a radially expanded state, said outer hollow shaft and said sleeve are moved closer to each other so as to set said former means into an axially contracted state, and said right slider means and said left slider means are moved further away from each other so as to set said former means into a radially contracted state, and whereby said center segment support means causes said right and left side segments to slide underneath said center segment when said former means is in said axially contracted state.

2. A tire building apparatus according to claim 1 wherein said slider means includes an expandable bladder for turning up a side end portion of a carcass around a bead ring.

3. A tire building apparatus according to claim 2 wherein said slider means further includes pressing means for pressing said bladder to said bead ring around which said side end portion of said carcass has been turned up.

4. A tire building apparatus according to claim 1 wherein:
said right side segment includes a right end having a face perpendicular to an axis of said inner shaft; and
said left segment includes a left end having a face perpendicular to said axis of said inner shaft.

5. A tire building apparatus according to claim 1 wherein said center segment support means includes:
right moving means for moving said right side segment in at least an axial direction;
left moving means for moving said left side segment in at least an axial direction;
an axially extended rod attached to one of said right or left moving means;
an element radially movably attached to said center segment and slidably supported by said axially extended rod;
a first biasing member provided on said element for biasing said center segment in an inner radial direction so as to bring said center segment into contact with said right side segment and said left side segment; and
a second biasing member provided between one of said right or left moving means and said element for biasing said element toward the other side segment when both of the side segments are moved closer to each other.

6. A tire building apparatus comprising:
former means including a plurality of segment units arranged in a circumference, each of aid segment units having; a center segment, a right side segment, and a left side segment,
right moving means for moving said right side segment in at least an axial direction;
left moving means for moving said left side segment in at least an axial direction; and
center segment support means for supporting said center segment in a central position of said former means, said center segment support means including:
an axially extending rod attached to one of said left or right moving means;
an element radially movably attached to said center segment and slidably supported by said axially extended rod;
a first biasing member provided on said element for biasing said center segment in an inner radial direction so as to bring said center segment into contact with said right side segment and said left side segment; and
a second biasing member provided between one of said right or left moving means and said element for biasing said element toward the other side segment when both of the side segments are moved closer to each other.

* * * * *